United States Patent [19] [11] Patent Number: 4,560,541
Davis [45] Date of Patent: Dec. 24, 1985

[54] PRODUCTION OF LOW SILICA CONTENT, HIGH PURITY ALUMINA

[75] Inventor: Gerald E. Davis, Tucson, Ariz.

[73] Assignee: Atlantic Richfield Company, Los Angeles, Calif.

[21] Appl. No.: 589,927

[22] Filed: Mar. 15, 1984

[51] Int. Cl.$^4$ .............................................. C01F 7/22
[52] U.S. Cl. .................................... 423/126; 423/132; 423/495
[58] Field of Search ........................ 423/126, 132, 495

[56] References Cited

U.S. PATENT DOCUMENTS

| 3,144,304 | 8/1964 | Nagumo et al. | 423/126 |
| 4,056,363 | 11/1977 | Messner | 423/126 |
| 4,222,989 | 9/1980 | Belsky et al. | 423/126 |
| 4,239,735 | 12/1980 | Eisele et al. | 423/126 |
| 4,331,636 | 5/1982 | Suoronos | 423/126 |
| 4,465,659 | 8/1984 | Cambridge et al. | 423/126 |

Primary Examiner—H. T. Carter
Attorney, Agent, or Firm—Craig E. Larson

[57] ABSTRACT

A process is described for the formation of high purity alumina from aluminas such as Bayer Process alumina trihydrate (gibbsite) which contain both acid-soluble and -insoluble impurities, notably soda and silica. The solid hydrated alumina is reacted with a stoichiometric quantity of concentrated HCl to form a reaction product comprising of dissolved aluminum chloride and solid aluminum chloride hexahydrate (ACH). The acid and/or aluminum chloride concentration of the solution is then adjusted (as by water addition) to dissolve the solid ACH and form a solution at or near saturation in aluminum chloride, but with the remaining solid materials undissolved. The solution is then subjected to solid/liquid separation to eliminate the insoluble impurities, such as silica. Thereafter, the concentration is again adjusted to cause the ACH to crystallize and precipitate preferentially to the soluble impurities, following which the ACH is recovered as a solid and calcined in a single or multistage calcination to high purity alumina. The purified products find use in the specialty ceramics field, as synthetic sapphire, translucent tubing or other applications in which alumina must meet SPA specifications.

9 Claims, No Drawings

PRODUCTION OF LOW SILICA CONTENT, HIGH PURITY ALUMINA

TECHNICAL FIELD

The invention herein relates to the formation of alumina. More particularly it relates to the production of grades of high purity alumina suitable for use in ceramics, electronic components, synthetic sapphire, translucent materials and other applications requiring alumina of low impurity contents.

BACKGROUND ART

Most commercial alumina is produced according to the "Bayer Process", a well known process for the production of alumina from bauxite. In the Bayer Process, bauxite is mixed with hot concentrated NaOH which reacts with and puts into solution some of the alumina, silica and other components of the bauxite. Most of the silica and other materials are reprecipitated and eliminated as a solid waste referred to as "red mud". The dissolved alumina is then separated in solution from remaining solids and crystalized as alumina trihydrate, $\alpha$-$Al_2O_3 \cdot 3H_2O$ ("gibbsite"). Because it is formed in a sodium hydroxide environment, the gibbsite contains a significant amount (usually 0.3 to 0.4%) soda, $Na_2O$. (All percentages herein are by weight unless otherwise noted.) In addition, the economics of the Bayer Process are such that significant amounts of other impurities such as silica are tolerated in the gibbsite product. A typical analysis of gibbsite from the Bayer Process is shown in Table 1. In accordance with the usual practice, impurities are expressed as the stable oxide form.

TABLE 1

| Impurities | Concentration, % |
|---|---|
| $Na_2O$ | 0.3 |
| $SiO_2$ | 0.01–0.04 |
| $CaO$ | 0.025 |
| $Ga_2O_3$ | 0.01 |
| $Fe_2O_3$ | 0.01 |

A number of other minor oxides are also present, in quantities of less than a few hundred ppm each. When the Bayer Process alumina trihydrate is calcined to produce anhydrous alumina, $Al_2O_3$, the impurities are concentrated by a factor of about 1.5.

While most of the commercial hydrated alumina is produced by the Bayer Process as described, it is possible to produce hydrated alumina by other methods. To the extent that such other methods result in the inclusion of unacceptably high levels of silica in the hydrated alumina, the purification process of the present invention will be applicable to purification of those materials. For brevity herein, however, the process of this invention will be described in terms of the purification of Bayer Process-produced gibbsite, although it is to be understood that it is applicable to all hydrated aluminas containing silica as an impurity.

For most alumina uses, such as electrolytic production of aluminum metal or formation of ordinary ceramic products and refractories, the gibbsite is usable even with these high levels of impurities present. For a number of applications, however, these impurity levels (particularly the high soda and silica levels) are unacceptable. These applications include products intended for use as synthetic sapphire and as translucent bodies. Depending upon the particular application or product, maximum alumina impurity levels for materials such as soda, silica or iron oxide may be as low as 0.002% (20 ppm).

Previously, most aluminas of low soda content were derived from the gibbsite made by the Bayer Process. Reduction in soda levels was accomplished by one of several methods that could attain, at best, minimum $Na_2O$ levels of 0.02–0.05% (200–500 ppm). Recently, however, a process has been developed by researchers of ARCO Metals Company in which, by a solid-to-solid reaction conducted in aqueous hydrochloric acid, the hydrated alumina is converted to aluminum chloride hexahydrate (ACH) and many the impurities, particularly the soda, are eliminated by conversion to soluble chlorides in the aqueous acid. This process (which will be referred to herein as the "ACH Process") has been described and claimed in a co-pending patent application assigned to the assignee of the present invention. Through the use of this process low soda content, high purity alumina can easily be made which is suitable for many applications.

While the ACH Process has been extremely effective for removal of those impurities in the hydrated alumina which can be converted to soluble chlorides, an important and common impurity, silica, does not readily react with the aqueous hydrochloric acid and therefore remains as a solid impurity dispersed in the solid ACH product. Since the initial silica content of the hydrated alumina is relatively low (particularly by comparison to the soda content) this silica impurity content level in the ACH product is unobjectionable for many applications. For numerous important applications, however, the resultant silica impurity content level is unacceptable. These applications are those which employ aluminas known in the industry as "super purity aluminas" ("SPA") which require a total impurity content of less than 0.01% (100 ppm). Typical SPA applications include synthetic sapphire, alumina optical glass and translucent tubing of the type used in sodium vapor lamps. In each of these applications it is important that the silica impurity content level in particular be minimized. For instance, in synthetic sapphire a typical specification requires not more than 0.003% (30 ppm) silica while in a typical specification for translucent tubing the maximum silica content is 0.005% (50 pm). Since the typical Bayer process hydrated alumina normally contains two to fifteen times more silica than those maxima, and since the silica impurity passes through the aforementioned ACH Process with no more than minor reduction, the resulting silica impurity level in the product ACH results after conversion in an ACH-derived alumina which is not suitable for SPA applications.

There is also a class of aluminas known in the industry as "high purity aluminas" ("HPA") which have less stringent impurity requirements than SPA, but which still represent significantly higher purity levels than ordinary aluminas. The invention herein is useful in producing HPA, but is most advantageously used for SPA production.

It would therefore be valuable to have a process which would serve not only to reduce the acid-soluble impurities to minimal levels but would also eliminate many of the acid-insoluble impurities (especially silica) in the alumina, such that the ultimate product alumina derived from the ACH would be acceptable in all respects for HPA and SPA applications.

DISCLOSURE OF INVENTION

I have now discovered an improvement in the ACH process by which alumina substantially free of both acid-soluble and -insoluble impurities can be easily obtained from hydrated forms of alumina. These may be gibbsite, bayerite, boehmite, diaspore or any other form of impure hydrated alumina. The invention herein is therefore a process for the reduction of the impurity content in alumina produced from a solid hydrated alumina containing a significant content of hydrochloric acid-soluble and -insoluble impurities, which comprises:

a. reacting the impure hydrated alumina with at least a stoichiometric amount of concentrated hydrochloric acid to convert at least a portion of the hydrated alumina to a reaction product comprising dissolved aluminum chloride and solid aluminum chloride hexahydrate;

b. adjusting the water content of the resultant solution to allow for complete dissolution of the aluminum chloride hexahydrate portion of the reaction product, as well as soluble metal chloride impurities present;

c. subjecting the saturated aluminum chloride solution to liquid/solid separation to separate solid undissolved impurities or unreacted hydrated alumina from the solution;

d. adjusting the acid content of the solution to reduce the solubility of the aluminum chloride hexahydrate and cause at least a portion of the aluminum chloride to precipitate as crystalline aluminum chloride hexahydrate;

e. recovering the solid precipitated aluminum chloride hexahydrate from the acid solution containing soluble impurities; and f. calcining the recovered solid aluminum chloride hexahydrate to effect dissociation and to separate HCl and water and form substantially anhydrous amorphous or crystalline alumina having a content of acid-soluble and -insoluble impurities lower than the corresponding impurity level in the hydrated alumina.

In a preferred embodiment, the solution formed in step (b) is at or near saturation in aluminum chloride hexahydrate.

For the purpose herein, the reaction product in aqueous solution is normally referred to as aluminum chloride ($AlCl_3$) while the crystalline solid is referred to as aluminum chloride hexahydrate (ACH).

MODES FOR CARRYING OUT THE INVENTION

The invention herein is an improvement in the ACH Process for producing high purity alumina from relatively impure hydrated alumina, exemplified by Bayer Process gibbsite. In the present invention, both acid-soluble and -insoluble impurities are reduced to a very low level by converting the hydrated alumina to $AlCl_3$ by reaction with at least a stoichiometric quantity of concentrated hydrochloric acid, formation of an acid solution of $AlCl_3$ (preferably saturated in $AlCl_3$), liquid/solid separation of the acid solution to separate the acid-insoluble impurities and any unreacted alumina trihydrate, adjustment of the acid content of the saturated solution to lower the solubility of the $AlCl_3$ and precipitate the $AlCl_3$ as solid ACH while maintaining the acid-soluble impurities in solution, separation of the solid ACH from the solution by liquid/solid separation and calcination of the ACH to produce high purity essentially anhydrous alumina.

The initial reaction of the present invention is the stoichiometric conversion of the impure hydrated alumina to $AlCl_3$ in concentrated hydrochloric acid according to the following reaction:

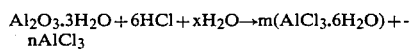

$$Al_2O_3.3H_2O + 6HCl + xH_2O \rightarrow m(AlCl_3.6H_2O) + nAlCl_3$$

Before addition of the extra water to effect total solution of the reaction product (see below), there is present a supersaturated solution of forms of aluminum chloride. Generally about 75% of the reaction product is in solution as $AlCl_3$ (i.e., n is about 1.5) and the other 25% is crystalline ACH (i.e., m is about 0.5). The water to balance the equation initially is represented by $xH_2O$, where x is about 1.

For this reaction is it preferred that the hydrochloric acid be concentrated at the standard 36% acid level. As will be mentioned below, use of 36% acid requires that water be added to form the subsequent saturated ACH solution. It is also, however, possible to use acid with a lower degree of concentration (which can be calculated to be approximately 31% acid) which will result after stoichiometric reaction in a saturated solution to which no further water need be added. Intermediate levels of concentration will of course require the addition of intermediate levels of water. It is preferred, however, to use the 36% concentration and add the additional water, because the kinetics of the 36% acid in the reaction are significantly better than those of the lower concentrations.

The reaction as applied to the ACH Process is believed to function to form a precursor low in acid-solution impurities for the final alumina product by reactively dissolving both the $AlCl_3$ formed from the hydrated alumina and the major portion of its included acid-soluble impurity metal oxides. The dissolved $AlCl_3$ in the defined range of acid concentration precipitates spontaneously as solid ACH. The soluble impurities, on the other hand, at this acid concentration remain substantially dissolved in the acid, so that the subsequent solid/liquid separation process separates high purity ACH from the impure solution.

As noted previously, however, the ACH Process solution reaction does not eliminate the impurities which are generally insoluble or unreactive in the acid. Principal among these is silica, although it is also believed that some other impurities may also carry through. In addition, some oxides may react to form insoluble chlorides. In addition, if the initial reaction between the hydrated alumina and the HCl is not carried to completion, some insoluble unreacted hydrated alumina will also be present. The silica and other acid-insoluble compounds remain as solid impurities dispersed in the solid ACH product. Subsequent calcining of the ACH (and unreacted hydrated alumina) to form alumina does not affect these solid impurities, so that the final alumina product also contains the solid impurities.

The acid conversion reaction is normally operated in the temperature range of 40°–120° C. in a closed vessel. The closed vessel prevents escape of any gaseous chloride materials and facilitates the recovery and recycle of the HCl and water. The reaction is conducted under ambient pressure conditions. Evolved hydrogen chloride and water vapor generated during the reaction are normally removed continually by a vent system. The preferred temperatures for the operation of the process are usually in the range of 70°–80° C., but that preferred range can vary depending on the particular materials from which the reaction vessel is constructed, due to differing degrees of resistance to the corrosive attack of the hot concentrated acid. (The higher or lower temperatures in the overall range—e.g. 40° C. or 90° C.—may be of particular value for control of crystal size of the ACH product.) The initial percent solids in the reaction mixture is in the range of 5–40% (by weight). The preferred range is 10–20%. At the end of the reaction, the slurry has a solids content in the range of 12–60% with the preferred value being between 25–50%.

The reactions carried out such that there is stoichiometric reaction of the hydrated alumina with the hydrochloric acid to form a solution of $AlCl_3$. Use of 36% concentrated HCl results in a mixture which is composed of a saturated solution of $AlCl_3$ and solid crystals of ACH. In order to provide for separation of the solid impurities, the $AlCl_3$ weight fraction in the solution must be reduced so that all ACH present will be dissolved, leaving only the insoluble impurities in solid form. It is preferred that one use a solution which is at or slightly below saturation in order to minimize the amount of water which is added (and must be later offset). Consequently, in the preferred form of the invention water is added to decrease the $AlCl_3$ weight fraction to the point at which the solution is just saturated (with no solid ACH crystals remaining because of super-saturation), which can be calculated to be approximately 31% concentration of aluminum chloride. As noted above, it is possible to run the reaction in less concentrated acid so that all or at least part of the requisite water is already present. However, it has been found that the kinetics of the conversion reaction in the more dilute solutions are less favorable, and therefore it is preferred to run the conversion reaction in the 36% acid and subsequently add water following completion of the reaction to dilute the solution.

After the solution has been diluted to the preferred saturation level of $AlCl_3$, the solution is subjected to conventional liquid/solid separation techniques. These may include filtration, centrifugation and the like. By this step the solid acid-insoluble impurities are substantially removed from the solution. The principal impurity of interest is silica. It has been found that by this process silica contents are readily lowered to well below the maximum impurity levels required for the SPA applications, and that in fact substantially complete elimination of silica from the system can be obtained. The exact type of liquid/solid separation techniques used herein is not critical, and those skilled in the art will be well familiar with those filtration, centrifugation and similar processes and apparatus which will perform adequately in the present process.

It is believed that certain iron oxide impurities in alumina may under the conditions of the present process form an insoluble iron chloride. While the formation and removal of such iron chloride has not been directly observed, it is expected that the present process in acting to remove the solid silica impurity will also eliminate any such solid iron chloride which may be present. It would also be expected that other insoluble chlorides or other impurities (such as unreacted hydrated alumina) which may be present would also be significantly or substantially eliminated by the present invention.

Following the liquid/solid separation of the solid impurities, the saturated solution is treated to reduce the $AlCl_3$ solubility in the solution and crystallize at least a portion of the $AlCl_3$ as the ACH product. This is most conveniently accomplished by addition of anhydrous HCl to the solution. Concentrated HCl solutions could also be used but this would result in large solution volumes impractical for HCl recovery. The degree of crystallization of the ACH should be controlled to minimize the simultaneous crystallization of the acid-insoluble impurities. Since the ACH crystallizes preferentially to these impurities, such can be accomplished by controlled incorporation of the anhydrous HCl into the solution so that the solubility level of the dissolved impurities is not exceeded.

Following completion of the crystallization, the precipitated ACH is separated from the acid solution by conventional solid/liquid separation techniques. It is thereafter washed at least once (preferably several times) with highly concentrated HCl solutions to remove remaining traces of the reaction liquor containing dissolved impurities. The washing step is an integral part of impurity removal, for it eliminates impurities carried with the ACH by adsoption or co-precipitation, and also removes the traces of impure process liquor adhering to the solid ACH surfaces. For example, when 50 g $AlCl_3.6H_2O$ containing 0.04% $Na_2O$ was washed with 100 ml of concentrated hydrochloric acid, the clean solid contained only 0.002% $Na_2O$. Washing with water or very dilute acid is to be avoided, since the ACH will dissolve in such liquids. For that reason it is also desirable to keep the concentration of the wash acid at 25 to 35% HCl (preferably 30–35%) to minimize any redissolution of the ACH particles.

The liquor recovered in the solid/liquid separation step is recycled to the reaction step of the process. A fraction (usually about 25–50%) is purified to control impurity levels in the system in the manner known from the ACH Process. Alternatively, one could purify all the filtrate so that no impurities would be recycled.

The calcination of solid ACH may be accomplished in rotary kilns, flash calciners or fluidized bed calciners. In one variation of this process a concentrated aqueous solution of ACH can be decomposed in a spray roaster to produce a form of alumina and regenerate water and hydrochloric acid.

The temperature at which the decomposition occurs determines the nature of the aluminous product. Decomposition occurs over the range 150° C. to 1400° C. Decomposition at temperatures below 700° C. generates an amorphous solid having a composition dependent on the calcining temperature. The major components (expressed as $Al_2O_3$ and chloride expressed as Cl) are present in the following amounts at 400° C. (5–8% Cl and 91–95% $Al_2O_3$) and at 700° C. (3–5% Cl and 94–97% $Al_2O_3$). In the range of 700°–800° C. the calcination yields one or more transition alumina phases having less than 0.5% residual chloride. At 800° C. the calcination product is 100% one or more transition alumina phases with 0.25% Cl content. Between 800° C. and 1200° C. the relative proportions of the transition alumina phases and alpha alumina depends on the conditions of preparation. Above 1350° C. the product of calcination is 100% $\alpha$-$Al_2O_3$. (It will be recognized by those skilled in the art that all of the foregoing temperature/phase relationships are also dependent on conventional time/temperature relationships.)

The calcination is preferably performed in two stages. In the first stage, preferably conducted at 400° C. to 800° C. for a period of 15 to 100 minutes, the HCl and water contents are reduced by 90-99%. In the second stage, preferably conducted at 800° C. to 1350° C. for 10 to 100 minutes, the HCl and water contents are further reduced by 98-99.99%. As will be recognized by those skilled in the art, these ranges of time and temperature may be varied somewhat, depending on the materials involved, particle size and similar factors. The precise conditions which are optimum for each stage will be a matter of routine determination.

The HCl and water recovered from calcination can be, and preferably are, recycled to the conversion step. Since they contain few impurities they need not be treated as is all or a portion of the other recycle stream described above.

STATEMENT OF INDUSTRIAL APPLICATION

The invention herein is applicable to those industrial processes and products which require very high purity alumina in their composition or for specific reactions. It is most immediately applicable to the ceramics industry and will provide alumina of purity sufficient for SPA applications as various ceramic products, including translucent bodies and synthetic sapphire.

It will be immediately evident to those skilled in the art that the invention herein encompasses embodiments which, while not specifically described above, are clearly within the scope and spirit of the invention. Consequently, the scope of the present invention is to be determined solely by the appended claims.

I claim:

1. A process for the reduction of the impurity content in alumina produced from a solid hydrated alumina containing a significant content of hydrochloric acid-soluble and -insoluble impurities, which comprises:
    a. reacting the impure hydrated alumina with at least a stoichiometric amount of concentrated hydrochloric acid to convert at least a portion of the hydrated alumina to a reaction product comprising dissolved aluminum chloride and solid aluminum chloride hexahydrate;
    b. adjusting the water content of the resultant solution to allow for complete dissolution of the aluminum chloride hexahydrate portion of the reaction product, as well as soluble metal chloride impurities;
    c. subjecting the saturated aluminum chloride solution to liquid/solid separation to separate solid undissolved impurities and any unreacted hydrated alumina from the solution;
    d. adjusting the acid content of the solution to reduce the solubility of the aluminum chloride and cause at least a portion of the aluminum chloride to precipitate as crystalline aluminum chloride hexahydrate;
    e. recovering the solid precipitated aluminum chloride hexahydrate from the acid solution containing soluble impurities; and
    f. calcining the recovered solid aluminum chloride hexahydrate to effect dissociation and to separate HCl and water and form substantially anhydrous amorphous or crystalline alumina having a content of acid-soluble and -insoluble impurities lower than the corresponding impurity level in the hydrated alumina.

2. A process as in claim 1 wherein said solution produced in step (b) is at or slightly below saturation in aluminum chloride.

3. A process as in claims 1 or 2 wherein said acid-insoluble impurities comprise silica, unreacted hydrated alumina or iron chloride, the last being the insoluble product of the chlorination of iron oxide impurities in the hydrated alumina.

4. A process as in claim 3 wherein the acid-insoluble impurities comprise silica.

5. A process as in claims 1 or 2 wherein the liquid/solid separation of step (c) comprises centrifugation or filtration.

6. The process as in claim 5 wherein said acid-insoluble impurities comprise silica, unreacted hydrated alumina or ferric chloride, the last being the insoluble product of the chlorination of iron oxide impurities in the hydrated alumina.

7. A process as in claims 1 or 2 wherein the adjustment of the acid content of step (d) is accomplished by incorporation of anhydrous HCl into the solution.

8. The method of claim 1 wherein the alumina produced in step f. has a impurity content not greater than 0.02 percent by weight.

9. The method of claim 1 wherein impure hydrated alumina comprises alumina trihydrate.

* * * * *